US009545089B2

(12) United States Patent
Takechi et al.

(10) Patent No.: US 9,545,089 B2
(45) Date of Patent: Jan. 17, 2017

(54) DUAL-BEARING REEL SPOOL BRAKING DEVICE AND A DUAL-BEARING REEL

(71) Applicant: Shimano Inc., Sakai, Osaka (JP)

(72) Inventors: Kunio Takechi, Osaka (JP); Akira Niitsuma, Osaka (JP)

(73) Assignee: Shimano Inc., Osaka (JP)

( * ) Notice: Subject to any disclaimer, the term of this patent is extended or adjusted under 35 U.S.C. 154(b) by 318 days.

(21) Appl. No.: 14/296,175

(22) Filed: Jun. 4, 2014

(65) Prior Publication Data

US 2014/0374524 A1   Dec. 25, 2014

(30) Foreign Application Priority Data

Jun. 25, 2013   (JP) ................................ 2013-132845

(51) Int. Cl.
*A01K 89/01*       (2006.01)
*A01K 89/033*     (2006.01)
*A01K 89/0155*   (2006.01)

(52) U.S. Cl.
CPC ......... *A01K 89/033* (2013.01); *A01K 89/0155* (2013.01)

(58) Field of Classification Search
CPC ............ A01K 89/015; A01K 89/01557; A01K 89/033; A01K 89/055
See application file for complete search history.

(56) References Cited

U.S. PATENT DOCUMENTS

| 2,290,662 | A | * | 7/1942 | Willison | ............ | A01K 89/0155 |
|---|---|---|---|---|---|---|
| | | | | | | 242/289 |
| 2,941,747 | A | * | 6/1960 | Schmidt | ............... | A01K 89/015 |
| | | | | | | 242/226 |
| 2,967,676 | A | * | 1/1961 | Klingberg | ............ | A01K 89/033 |
| | | | | | | 188/180 |
| 4,390,140 | A | * | 6/1983 | Karlsson | ............ | A01K 89/0155 |
| | | | | | | 188/185 |
| 5,577,680 | A | * | 11/1996 | Ikuta | .................... | A01K 89/015 |
| | | | | | | 242/288 |
| 5,865,387 | A | * | 2/1999 | Hirano | ................ | A01K 89/0155 |
| | | | | | | 188/181 A |
| 5,934,588 | A | * | 8/1999 | Ylikangas | .......... | A01K 89/0155 |
| | | | | | | 188/185 |
| 5,967,443 | A | * | 10/1999 | Green | ................ | B65H 75/4447 |
| | | | | | | 188/185 |

(Continued)

FOREIGN PATENT DOCUMENTS

JP        2013-000086 A    1/2013

*Primary Examiner* — Emmanuel M Marcelo
(74) *Attorney, Agent, or Firm* — Global IP Counselors

(57) ABSTRACT

A dual-bearing reel spool braking device for applying a braking force to a spool rotatably mounted on a reel body, the dual-bearing reel spool braking device includes a brake drum, a rotating member, and a brake shoe. The brake drum is configured to be non-rotatably attached to the reel body. The rotating member is configured to rotate in conjunction with the rotation of the spool. The brake shoe is detachably attached to the rotating member and configured to contact the brake drum. The rotating member comprises a main body section, a swinging shaft section indisposed on the main body section and swingably supporting the brake shoe, and a main body section configured to guide the brake shoe when mounting the brake shoe to the swinging shaft section.

13 Claims, 11 Drawing Sheets

(56) References Cited

U.S. PATENT DOCUMENTS

| | | | | |
|---|---|---|---|---|
| 5,996,921 | A * | 12/1999 | Hogaki | A01K 89/0155 182/239 |
| 6,126,105 | A * | 10/2000 | Yamaguchi | A01K 89/0155 188/164 |
| 9,282,731 | B2 * | 3/2016 | Niitsuma | A01K 89/0155 |
| 2013/0181081 | A1 * | 7/2013 | Niitsuma | A01K 89/0155 242/289 |

* cited by examiner

DUAL-BEARING REEL SPOOL BRAKING DEVICE AND A DUAL-BEARING REEL

CROSS-REFERENCE TO RELATED APPLICATIONS

This application claims priority to Japanese Patent Application No. 2013-132845, filed on Jun. 25, 2013. The entire disclosure of Japanese Patent Application No. 2013-132845 is hereby incorporated herein by reference.

BACKGROUND

Field of Invention

The present invention relates to a dual-bearing reel spool braking device, specifically to a dual-bearing reel spool braking device that applies a braking force to a spool that is rotatably mounted on a reel body.

Background Information

In a dual-bearing reel that is used for casting, in order to prevent backlash, a braking force is generally applied to the spool. Conventional braking devices of this type are spool braking devices that apply a braking force to the spool using centrifugal force that is generated by the rotation of the spool, the braking force being adjustable from outside of the reel body. However, backlash is generated when the rotational speed of the spool is faster than the line delivering speed during casting.

In a conventional spool braking device, the spool braking device that applies the braking force to the spool by swinging a brake shoe and that has the brake shoe come into contact with the brake drum has been disclosed (refer to Japanese Laid-Open Patent Publication No. 2013-000086). In this spool braking device, a pair of brackets that face each other is fixed to the spool shaft. A pin is fixed to one bracket, and a mounting hole of the brake shoe is inserted in the pin. By mounting the other bracket to the end part of the pin, the brake shoe is swingable around the pin between the pair of brackets.

SUMMARY

In a conventional spool braking device, assembling the pair of brackets and the pin individually is necessary. For this reason, the number of steps required to assemble the brake shoe may increase. To solve this problem, various attempts have been made regarding the assembly of the brake shoe. One example that can be considered is integrally molding a pair of brackets and a pin (a rotating member); by forming a mounting section of the brake shoe in a C-shape instead of forming a hole section (the mounting hole described above), the brake shoe can be easily assembled. In this case, by elastically engaging the C-shaped mounting section of the brake shoe to the pin of the rotating member, the brake shoe can be easily mounted on the rotating member. However, when assembling this type of brake shoe, there is the risk that, in a state in which the brake shoe is facing the opposite way, the brake shoe will be mounted to the pin of the rotating member. In this case, the brake shoe will not properly work.

The present invention was made in light of problems like those described above, and the object of the present invention is to provide a spool braking device that can properly mount the brake shoe to the rotating member.

A dual-bearing reel spool braking device according to the first embodiment of the invention is a device that applies a braking force to a spool that is rotatably mounted on a reel body with centrifugal force.

The present spool braking device comprises a brake drum, a rotating member, and a brake shoe. The brake drum is non-rotatably attached to the reel body. The rotating member rotates in conjunction with the rotation of the spool. The brake shoe is detachably attached to the rotating member. The brake shoe swings due to the centrifugal force generated by the rotation of the rotating member and comes into contact with the brake drum. Here, the rotating member comprises a main body section, a swinging shaft section, and a mounting guide section. The swinging shaft section is disposed in the main body section and swingably supports the brake shoe. When mounting the brake shoe to the swinging shaft section, the mounting guide section guides the brake shoe.

In the present spool braking device, when mounting the brake shoe to the swinging shaft section of the rotating member, the mounting guide section of the rotating member guides the brake shoe. In other words, with the brake shoe being guided by the mounting guide section of the rotating member, the brake shoe is mounted to the swinging shaft section of the rotating member in the appropriate position. Accordingly, with the present spool braking device, the brake shoe can be properly attached to the rotating member.

In the dual-bearing reel spool braking device according to the second embodiment of the invention, the mounting guide section in the spool braking device recited in the first embodiment comprises a first mounting guide section that regulates the mounting angle of the brake shoe.

In this case, since the mounting angle of the brake shoe is regulated by the first mounting guide section, the brake shoe is mounted to the swinging shaft section of the rotating member in the appropriate position. That is, with the present spool braking device, the brake shoe can be properly attached to the rotating member.

In the dual-bearing reel spool braking device according to the third embodiment of the invention, the first mounting guide section in the spool braking device recited in the second embodiment is a protrusion that protrudes from the main body section.

In this case, since the user can determine whether or not the mounting angle of the brake shoe is appropriate based on the protrusion (the first mounting guide section), the brake shoe is mounted to the swinging shaft section of the rotating member in the appropriate position. That is, with the present spool braking device, the brake shoe can be properly attached to the rotating member.

In the dual-bearing reel spool braking device according to the fourth embodiment of the invention, the protrusion in the spool braking device recited in the third embodiment protrudes from the main body section toward a direction that is transverse to the direction in which the swinging shaft section extends.

In this case, since the protrusion (the first mounting guide section) protrudes from the main body section towards a direction that is transverse to the direction in which the swinging shaft section extends, the user can visually and reliably recognize the protrusion as a mark, and the brake shoe is mounted to the swinging shaft section of the rotating member with an appropriate position. That is, with the present spool braking device, the brake shoe can be properly attached to the rotating member.

In the dual-bearing reel spool braking device according to the fifth embodiment of the invention, the brake shoe in the spool braking device recited in the third or the fourth embodiment comprises a swing regulating section that regulates the swing range around the swinging shaft section. The swing regulating section can abut the protrusion.

In this case, since the swing regulating section of the brake shoe can abut the protrusion of the mounting guide section, the user can reliably see that the mounting state of the brake shoe is correct by the swinging shaft section of the brake shoe abutting the protrusion.

In the dual-bearing reel spool braking device according to the sixth embodiment of the invention, the mounting guide section in the spool braking device recited in any one of the second to the fifth embodiments further comprises a second mounting guide section. The second mounting guide section is disposed in the swinging shaft section and regulates the mounting position of the brake shoe.

In this case, since the mounting position of the brake shoe is regulated by the second mounting guide section, the brake shoe can be mounted in the appropriate position of the swinging shaft section. That is, with the present spool braking device, the brake shoe can be properly attached to the rotating member.

In the dual-bearing reel spool braking device according to the seventh embodiment of the invention, the swinging shaft section in the spool braking device recited in the sixth embodiment supports the brake shoe so that the brake shoe can move in the direction in which the swinging shaft section extends. The second mounting guide section is a protrusion or a recess disposed on the peripheral surface of the swinging shaft section.

In this case, the brake shoe swings in a state in which the mounting position of the brake shoe is regulated by the second mounting guide section (the protrusion or the recess). Additionally, by moving the brake shoe along the swinging shaft section, the position of the brake shoe is changed from a swingable position to a non-swingable position. In this way, in the present spool braking device, the brake shoe can be swung in a state in which the brake shoe is mounted to an appropriate position of the swinging shaft section. Furthermore, in the present spool braking device, the brake shoe can easily be made to be non-swingable by moving the brake shoe along the swinging shaft section.

In the dual-bearing reel spool braking device according to the eighth embodiment of the invention, the brake shoe in the spool braking device recited in the seventh embodiment comprises a recess or a protrusion. The recess or the protrusion of the brake shoe can engage the protrusion or the recess of the second mounting guide section.

In this case, for example, by engaging the protrusion (or the recess) of the brake shoe with the recess (or the protrusion) of the second mounting guide section, the brake shoe can be reliably positioned on the swinging shaft section.

According to the present invention, the brake shoe can be properly attached to the rotating member.

DETAILED DESCRIPTION OF THE INVENTION

1. Overall Structure of the Reel

Figure 1:
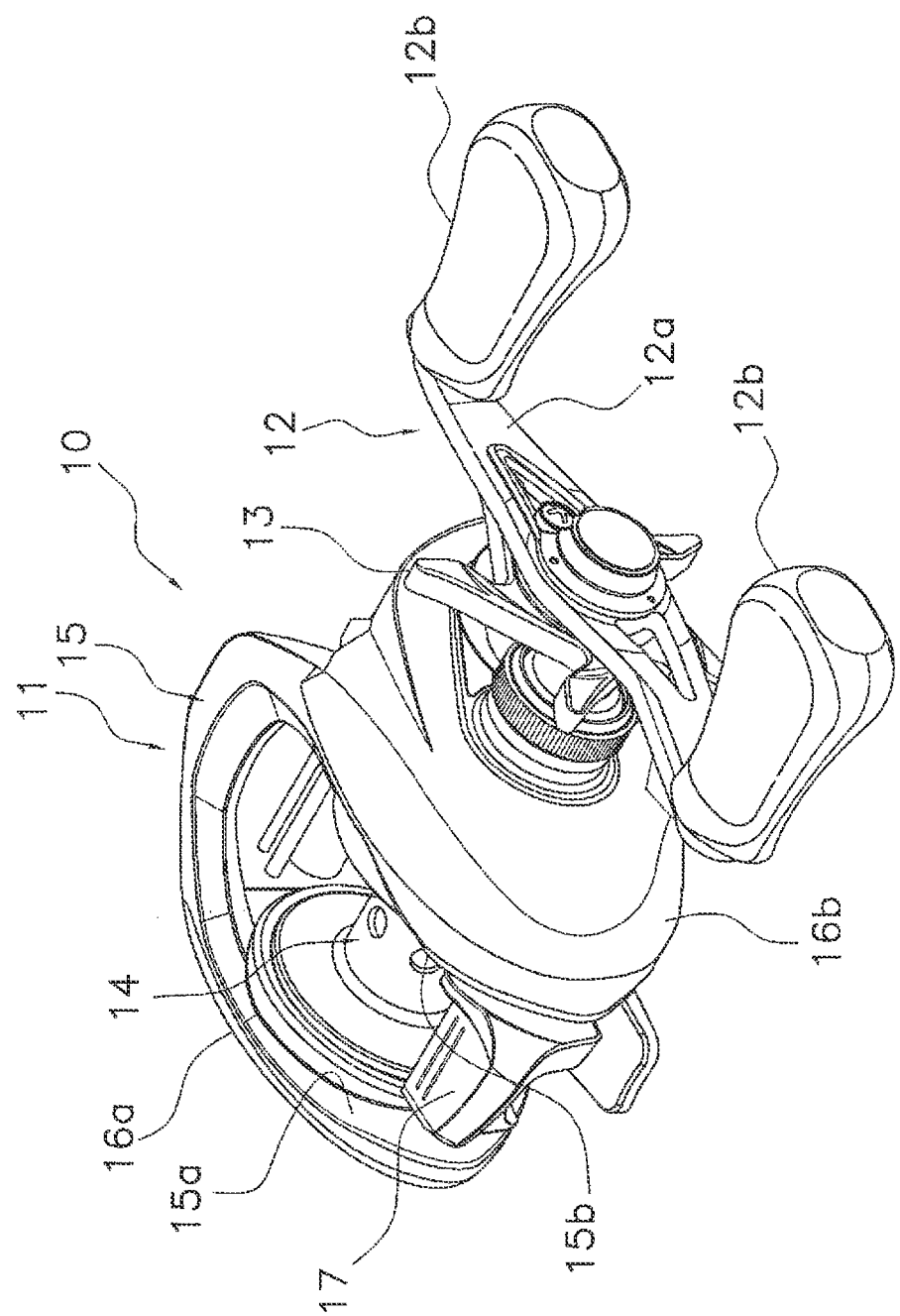
FIG. 1 is a cross-sectional view of a dual-bearing reel according to the first embodiment of the present invention.
Figure 2:
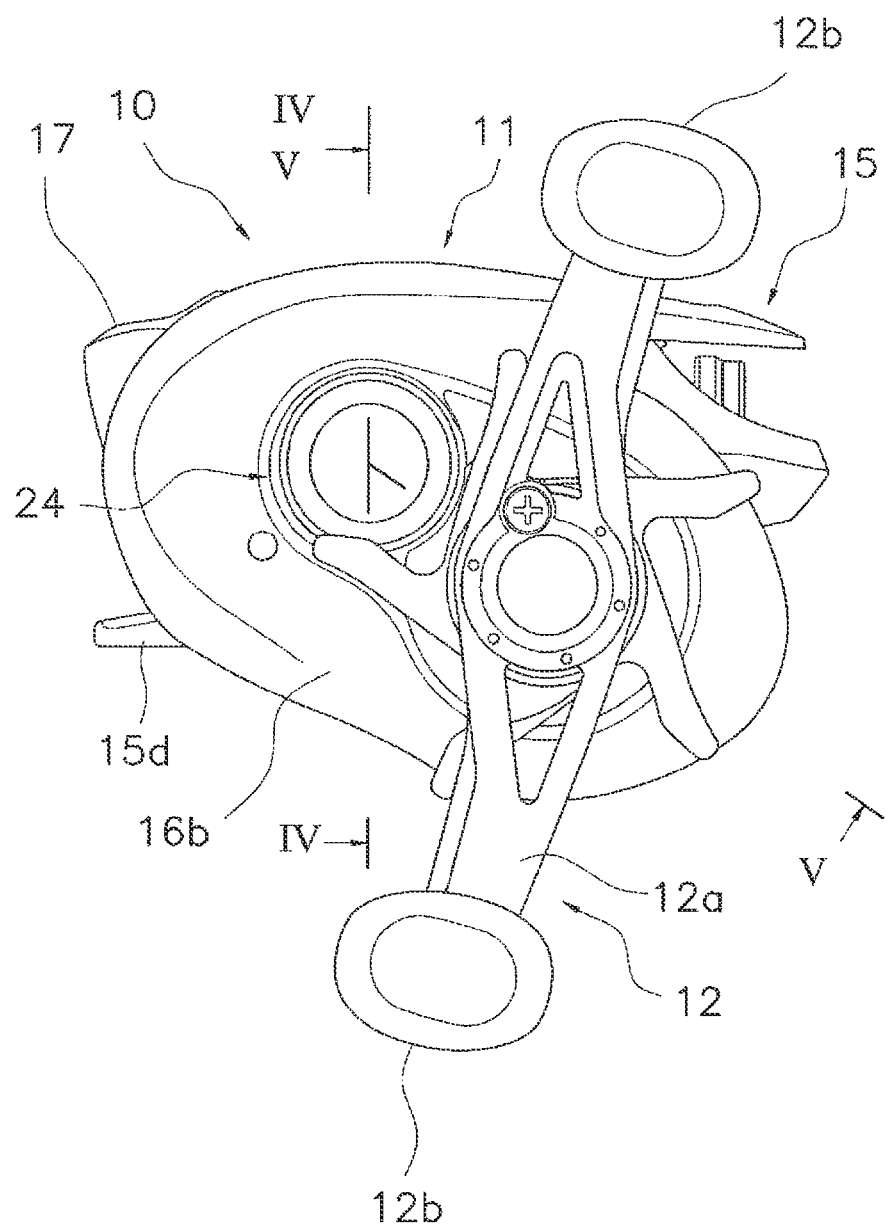
FIG. 2 is the right side view.
Figure 3:
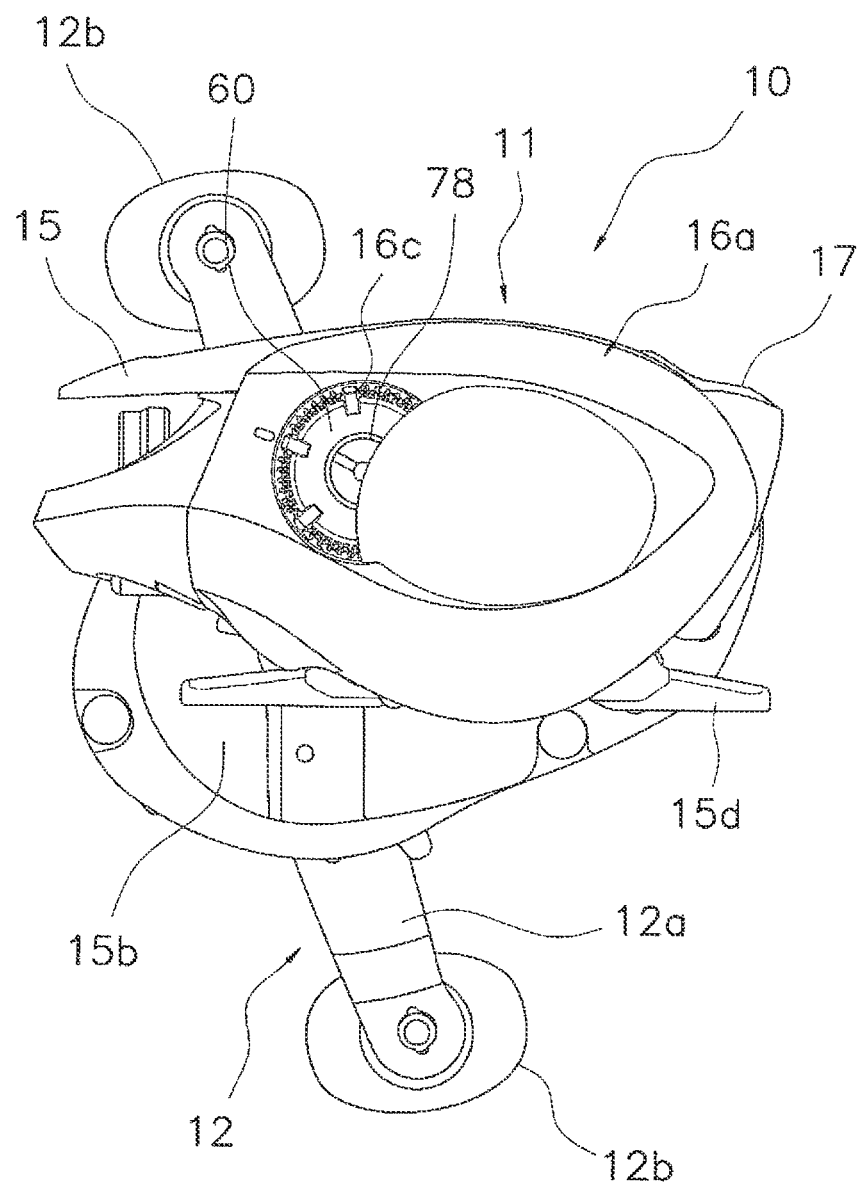
FIG. 3 is the left side view.

The dual-bearing reel 10 according to one embodiment of the present invention, as shown in FIG. 1 through FIG. 5, is a dual-bearing reel for bait casting. This reel 10 comprises a reel body 11, a spool rotary drive handle 12 that is disposed on the side of the reel body 11, a star drag 13 that adjusts the drag and is disposed on the reel body 11 side of the handle 12, a spool 14 for winding line, and a spool shaft 20 to which is mounted the spool 14.

Figure 5:
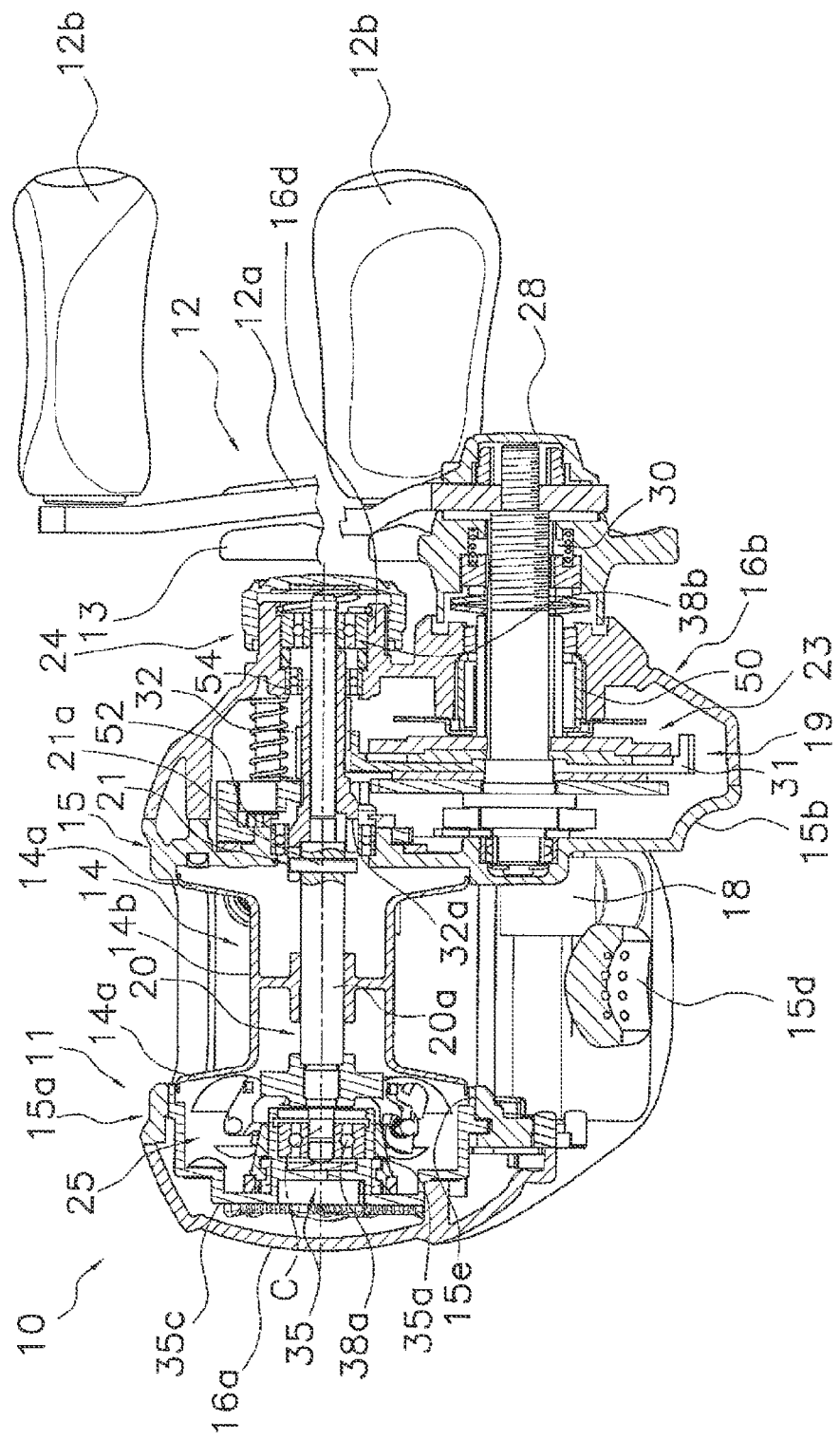
FIG. 5 is a cross-sectional view of the section line V-V in FIG. 2.

The handle 12 is a type of double handle, comprising an arm section 12a and grips 12b that are rotatably mounted on both ends of the arm section 12a. The arm section 12a, as shown in FIG. 5, is non-rotatably mounted on the tip of the drive shaft 30 and is fastened to the drive shaft 30 with a nut 28. The handle 12 is disposed on the second side cover 16b side mentioned below.

2. The Configuration of the Reel Body

Figure 4:
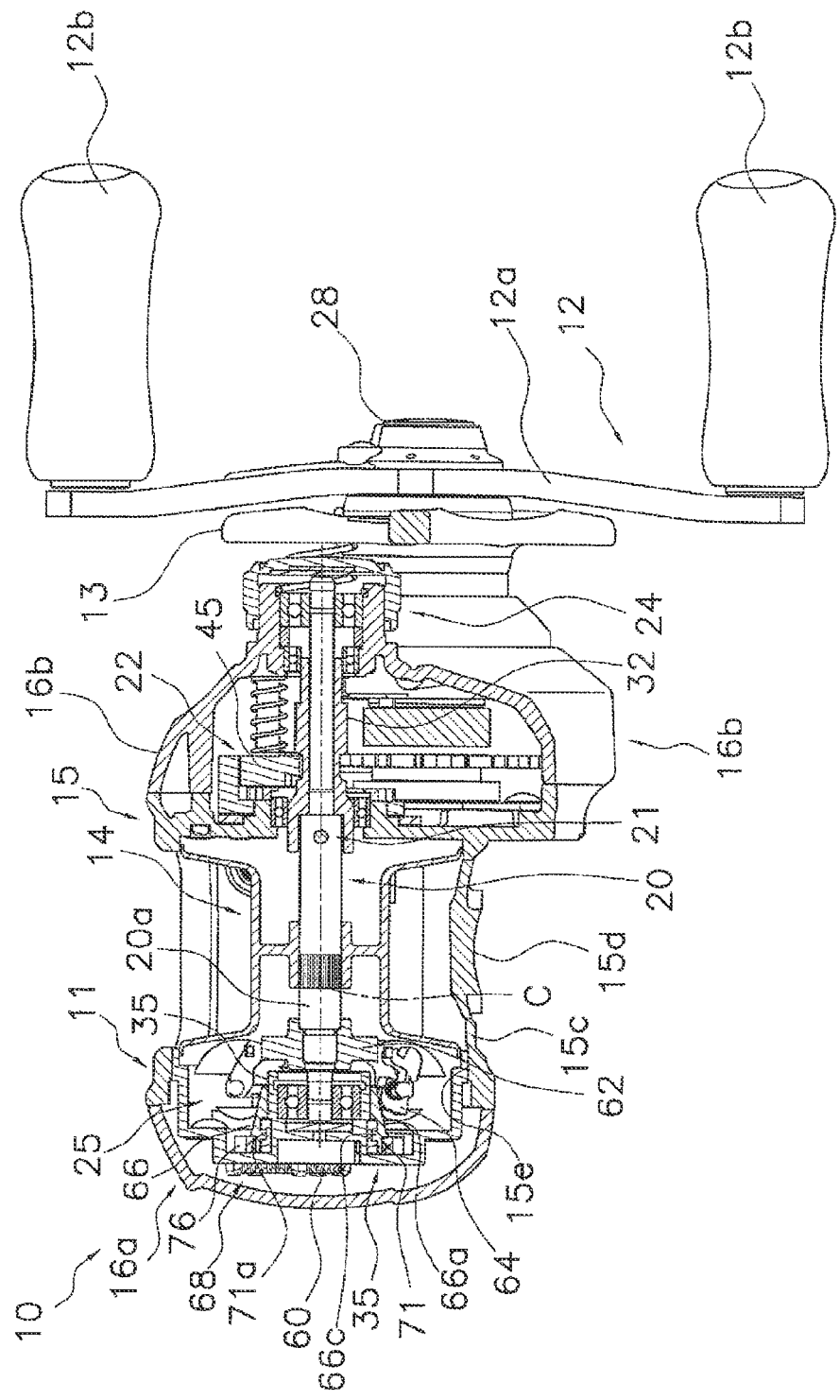
FIG. 4 is a cross-sectional view along the section line IV-IV of FIG. 2.

As shown in FIG. 4 and FIG. 5, the reel body 11 is, for example, a light metallic member, such as magnesium alloy, and comprises a shaft support section 35 and a frame 15, a first side cover 16a and a second side cover 16b that are mounted on the sides of the frame 15. A spool 14, via a spool shaft 20, is rotatably mounted inside of the reel body 11. As shown in FIG. 5, the first side cover 16a is detachably mounted to a first side plate 15a and covers the outside of the first side plate 15a. The second side cover 16b is screwed to the second side plate 15b and covers the outside of the second side plate 15b.

As shown in FIG. 1 through FIG. 5, disposed in the frame 15 are the spool 14, a clutch operating member 17, where the thumb is placed, and a level winding mechanism 18 for evenly winding the fishing line onto the spool 14.

Additionally, as shown in FIG. 4 and FIG. 5, between the frame 15 and the second side cover 16b, a gear mechanism 19, a clutch mechanism 21, a clutch control mechanism 22, a drag mechanism 23, and a casting control mechanism 24 are disposed. The gear mechanism 19 is disposed so as to transmit the torque from the handle 12 to the spool 14 and the level winding mechanism 18. The clutch mechanism 21 is disposed so as to couple and decouple the spool 14 and the handle 12. A clutch control mechanism 22 is disposed so as to control the clutch mechanism 21 according to the operation of the clutch operating member 17. The drag mechanism 23 is disposed so as to control the rotation in the line delivering direction of the spool 14. The casting control mechanism 24 is disposed so as to adjust the resistive force during the rotation of the spool 14. Additionally, a spool braking device 25 that uses centrifugal force for suppressing backlash during casting is disposed between the frame 15 and the first side cover 16a.

The frame 15, as shown in FIG. 4 and FIG. 5, comprises a first side plate 15a, a second side plate 15b that is disposed to mutually face the first side plate 15a with a predefined space therebetween, and a plurality of coupling sections 15c (for example, 3) that integrally couple the first side plate 15a and the second side plate 15b in the front and back as well as the lower part. A fishing rod mounting section 15d for mounting the fishing rod is integrally formed in the coupling section 15c on the lower side. The first side plate 15a comprises an opening section 15e that is circularly formed with a shaft core C of the spool shaft 20 as the center in the center part. A shaft support section 35 is detachably coupled with the opening section 15e.

Figure 6:
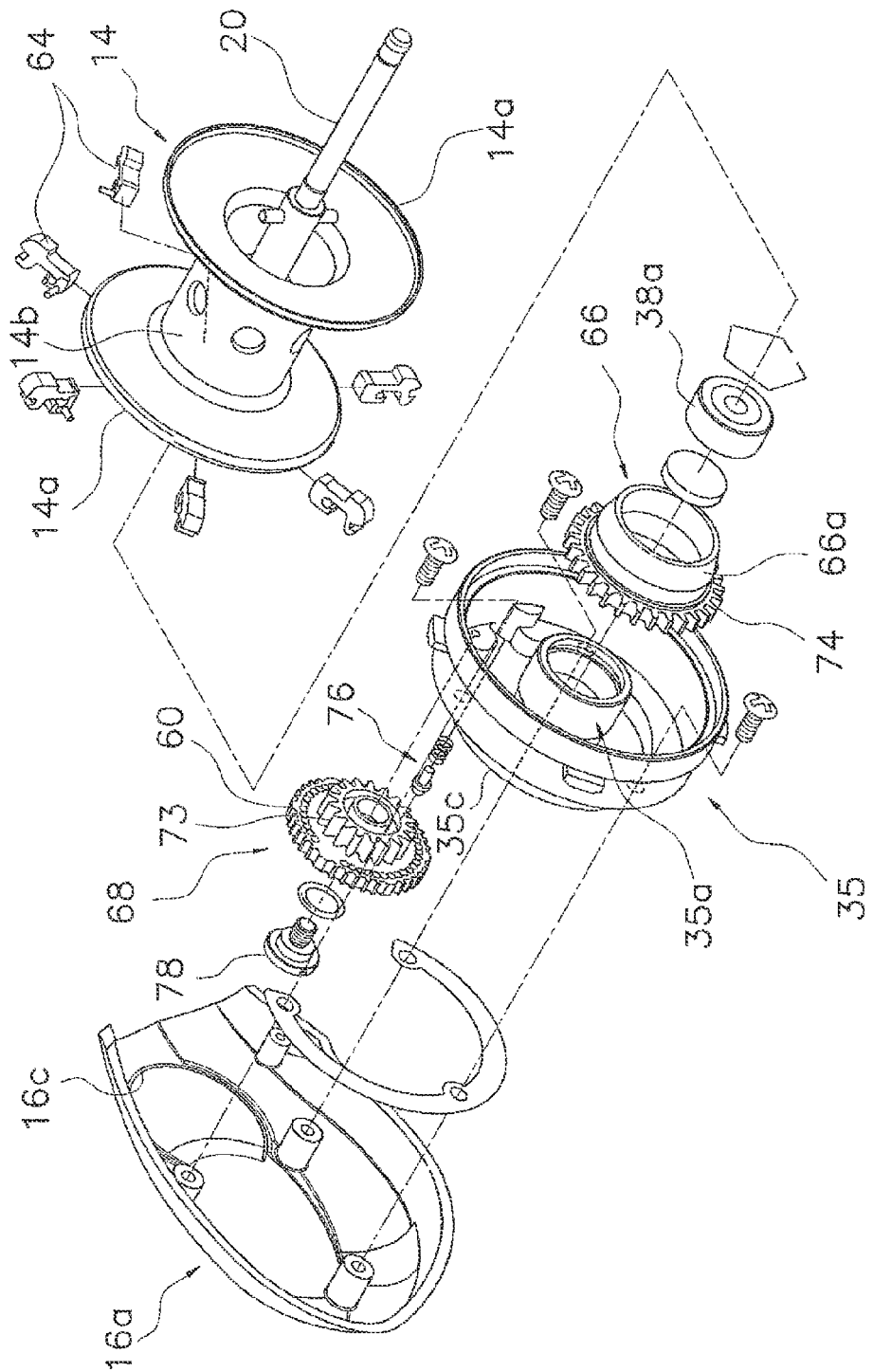
FIG. 6 is an exploded perspective view of the spool braking device.

The spool 14, as shown in FIG. 4 to FIG. 6, is disposed between the first side plate 15a and the second side plate 15b. The spool 14 is rotatably supported by the reel body 11. The spool 14 comprises plate-like flange sections 14a on both side parts and a tube-like reel body 14b between the two flange sections 14a. The spool 14 is integrally and rotatably fixed to the spool shaft 20 that extends through the inner peripheral side of the reel body 14b. For example, the spool 14 is integrally and rotatably fixed to the spool shaft 20 by serration bonding.

The spool shaft 20 is, for example, a non-magnetic metal such as SUS304, etc. The spool shaft 20, as shown in FIG. 5, extends outwards from the second side cover 16b while penetrating the second side plate 15b. One end (the left end in FIG. 5) of the spool shaft 20 is rotatably supported by an axle bearing housing section 35a via an axle bearing 38a. The other end (the right end in FIG. 5) of the spool shaft 20 that extends outwards from the second side cover 16b is rotatably supported by a boss section 16d that is formed on the second side cover 16b by the axle bearing 38b. A large-diameter section 20a is formed in the center part in the axial direction of the spool shaft 20. In the part where the large-diameter section 20a extends through the second side plate 15b a clutch pin 21a is disposed that forms the clutch mechanism 21 penetrates in the spool shaft 20 in the radial direction. Both ends of the clutch pin 21a protrude from the outer peripheral surface of the spool shaft 20.

The clutch operating member 17, as shown in FIG. 1, is disposed rearwards relative to the spool 14 in the rear part of dual-bearing reel 10 between the first side plate 15a and the second side plate 15b. The clutch operating member 17 is coupled to the clutch control mechanism 22. The clutch operating member 17 is slidable in the up/down direction between the first side plate 15a and the second side plate 15b. Sliding of the clutch operating member 17 causes the clutch mechanism 21 to be switched between the coupled state and the decoupled state. A guide axel (not shown) disposed on the spool 14 side of the first side plate 15a, enables the clutch operating member 17 to be guided in the up/down direction, causing the clutch operating member 17 to approach and separate from the fishing rod mounting section 15d.

The gear mechanism 19, as shown in FIG. 5, comprises a drive shaft 30, a drive gear 31 that is fixed to the drive shaft 30, and a tube-like pinion gear 32 that engages the drive gear 31. The drive shaft 30 is rotatably mounted to the second side plate 15b and the second side cover 16b. The rotation of the drive shaft 30 in the line delivering direction (the reverse rotation) is prohibited by a roller-type one-way clutch 50. The roller-type one-way clutch 50 is mounted between the second side cover 16b and the drive shaft 30.

The drive gear 31 is rotatably mounted to the drive shaft 30 and is coupled to the drive shaft 30 via the drag mechanism 23.

The pinion gear 32 extends in the spool shaft 20 direction while penetrating the second side plate 15b. The pinion gear 32 is a tube-like member with the spool shaft extending from the center thereof. The pinion gear 32 is mounted to the second side plate 15b and the second side cover 16b by an axle bearing 52 and an axle bearing 54 so as to be rotatable, as well as movable in the axial direction. An engaging groove 32a that engages with the clutch pin 21a is formed at one end of the pinion gear 32. The pinion gear 32 and the clutch pin 21a form the clutch mechanism 21. The pinion gear 32 moves to the clutch on position shown on the upper side of the shaft core C and to the clutch off position shown on the lower side of the shaft core C of the spool shaft 20 in FIG. 5 with the clutch control mechanism 22.

The clutch control mechanism 22, as shown in FIG. 4, comprises a clutch yoke 45 that moves the pinion gear 32 along the spool shaft 20 direction. When the clutch operating member 17 is moved to the clutch off position, the clutch yoke 45 moves the pinion gear to the clutch off position. Additionally, the clutch control mechanism 22 comprises a clutch return mechanism, which is not shown, that puts the clutch mechanism 21 in the clutch on position in conjunction with the rotation in the line winding direction of the spool 14.

3. Spool Braking Device

The spool braking device 25 is used to apply the braking force to the spool 14 using centrifugal force. The spool braking device 25 is mounted to the spool shaft 20 and the shaft support section 35. The spool braking device 25, as shown in FIG. 4 to FIG. 6, comprises a brake drum 66, a rotating member 62, a plurality of brake shoes 64 (for example, six (6) brake shoes), and a moving mechanism 68.

3-1. The Brake Drum

The brake drum 66 is disposed inwardly in the radial direction of the brake shoe 64. The brake drum 66 is in contact with the swinging brake shoe 64. Specifically, at least a part of the brake drum 66 is disposed inwardly in the radial direction with respect to the brake shoe 64. More specifically, the brake drum 66 comprises a tapered outer peripheral surface 66a (henceforth, referred to as the tapered surface) that tilts toward the spool 14. The tapered surface 66a is formed inwardly in the radial direction of the brake shoe 64, and the tapered surface 66a is in contact the swinging brake shoe 64.

3-2. Rotating Member

The rotating member 62 is, for example, a nearly circular member made from synthetic resin such as polyamide resin, polyacetal resin, etc. The rotating member 62 rotates in the line delivering direction of the spool 14, for example, the rotation of the spool 14. The rotating member 62 is integrally and rotatably coupled with the spool shaft 20 by an appropriate fixing process, such as press fitting.

Figure 7:
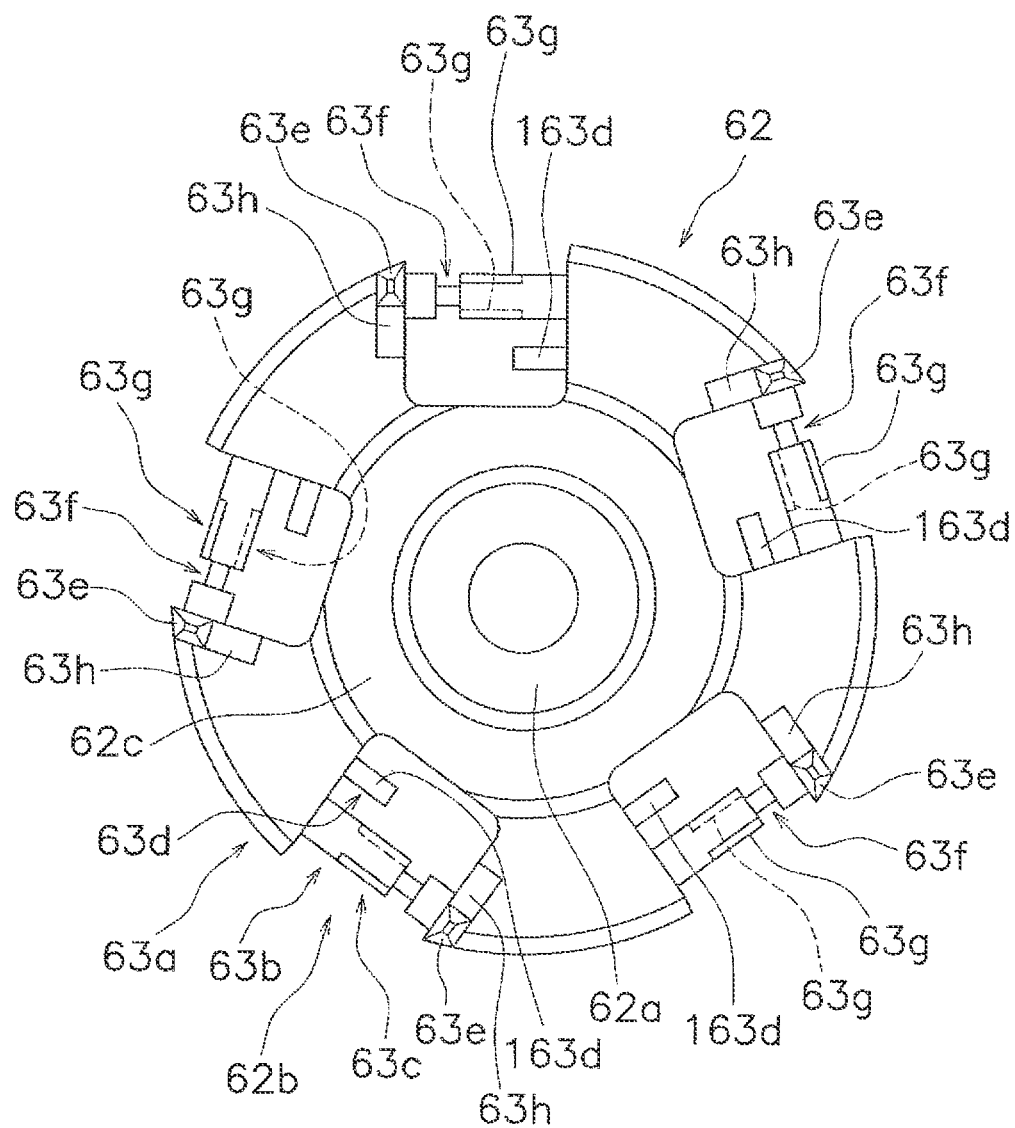
FIG. 7 is a side view of a rotating member.

The rotating member 62, as shown in FIG. 4 and FIG. 7, comprises a boss section 62a having an inner peripheral part fixed to the spool shaft 20, a thick-walled annular shoe attaching section 62b disposed outwardly in the radial direction of the boss section 62a, and a connecting section 62c connecting the boss section 62a and the shoe attaching section 62b. The boss section 62a is a tube-like section comprising a through-hole 62d with steps and that is penetrated by the spool shaft 20. The through-hole 62d is positioned by the spool shaft 20.

As shown in FIG. 7, the shoe attaching section 62b comprises a main body section 63a, a plurality of shoe support recesses 63b (for example, five (5) shoe support recesses), a plurality of swinging shaft sections 63c (for example, five (5) shoe support recesses), a plurality of mounting protrusions 63e (for example, five (5) shoe support recesses) (one example of the first mounting guide section), a plurality of guide sections 63h (for example, five (5) shoe support recesses), and a plurality of fixed sections 63d (for example, five (5) shoe support recesses).

The five shoe support recesses 63b are disposed in the main body section 63a. The shoe support recesses 63b are disposed so as to have spaces there between in the circumferential direction. In this embodiment, the shoe support recesses 63b are disposed at equal intervals in the rotating direction of the spool 14. The shoe support recesses 63b are formed concavely at a width so that the brake shoes 64 can be disposed and moved along the swinging shaft section 63c.

Figure 8:
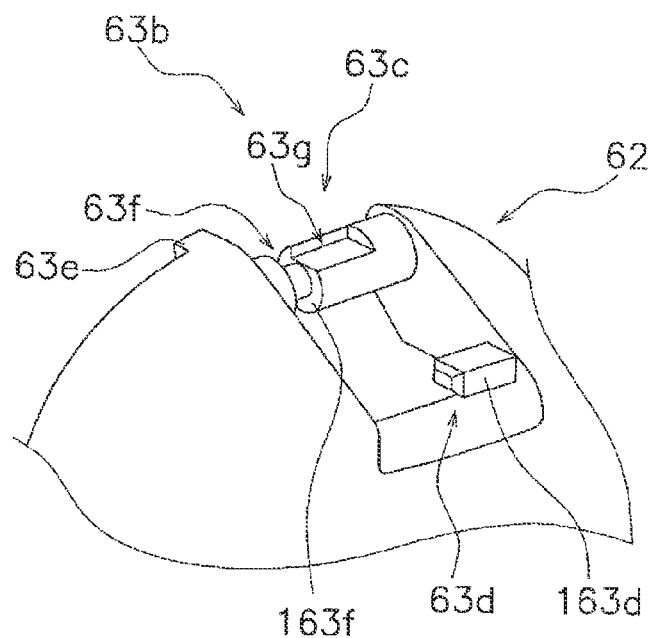
FIG. 8 is an enlarged oblique view of a shoe support recess.

As shown in FIG. 7 and FIG. 8, the swinging shaft section 63c supports the brake shoe 64 swingably as well as movably in the swinging shaft direction. The swinging shaft section 63c extends in a direction that is transverse to the spool shaft 20 and is integrally formed on the shoe support recess 63b. The swinging shaft section 63c is formed in a nearly circular shape.

The five swinging shaft sections 63c are disposed in the shoe support recesses 63b. The swinging shaft section 63c comprises a groove section 63f for swinging (one example of a second mounting guide section) that guides the swinging of the brake shoe 64 and a notched section 63g for moving that guides the movement of the brake shoe 64 in the swinging shaft direction.

The groove section 63f for swinging, guides the swinging of the brake shoe 64. Additionally, the groove section 63f for swinging, regulates the mounting position of the brake shoe. The groove section 63f for swinging is formed in the circumferential direction on the outer peripheral surface on one end side of the swinging shaft section 63c. The groove section 63f for swinging is formed in a position with a predefined space between this section and a wall section of the shoe support recess 63b.

Meanwhile, here, in the case of mounting the brake shoe 64 to the swinging shaft section 63c, the part that guides the brake shoe 64 (the mounting guide section) is formed by a mounting protrusion 63e (one example of the first mounting guide section) and a groove section 63f for swinging (one example of the second mounting guide section), mentioned below.

The notched section 63g for moving guides the brake shoe 64 in the swinging shaft direction. As shown in FIG. 7 through FIG. 11, the notched section 63g for moving is formed on the outer peripheral surface of the swinging shaft section 63c to extend in the axial direction of the swinging shaft section 63c. Specifically, a plurality of notched sections 63g for moving (for example 2) are formed on the outer peripheral surface of the swinging shaft section 63c. The notched section 63g for moving is used to guide the protrusion 64d for swinging (mentioned below) of the brake shoe 64. One end side of the notched section 63g for moving notches a wall section 163f (refer to FIG. 8) of the groove section 63f for swinging. More specifically, one end side of the notched section 63g for moving notches a wall section 163f of the groove section 63f for swinging on the side that is away from the wall section of the shoe support recess 63b.

The mounting protrusion 63e, in the case of mounting the brake shoe 64 to the swinging shaft section 63c, is used for guiding the brake shoe 64. For example, the mounting protrusion 63e regulates the mounting angle of the brake shoe 64.

Figure 12:
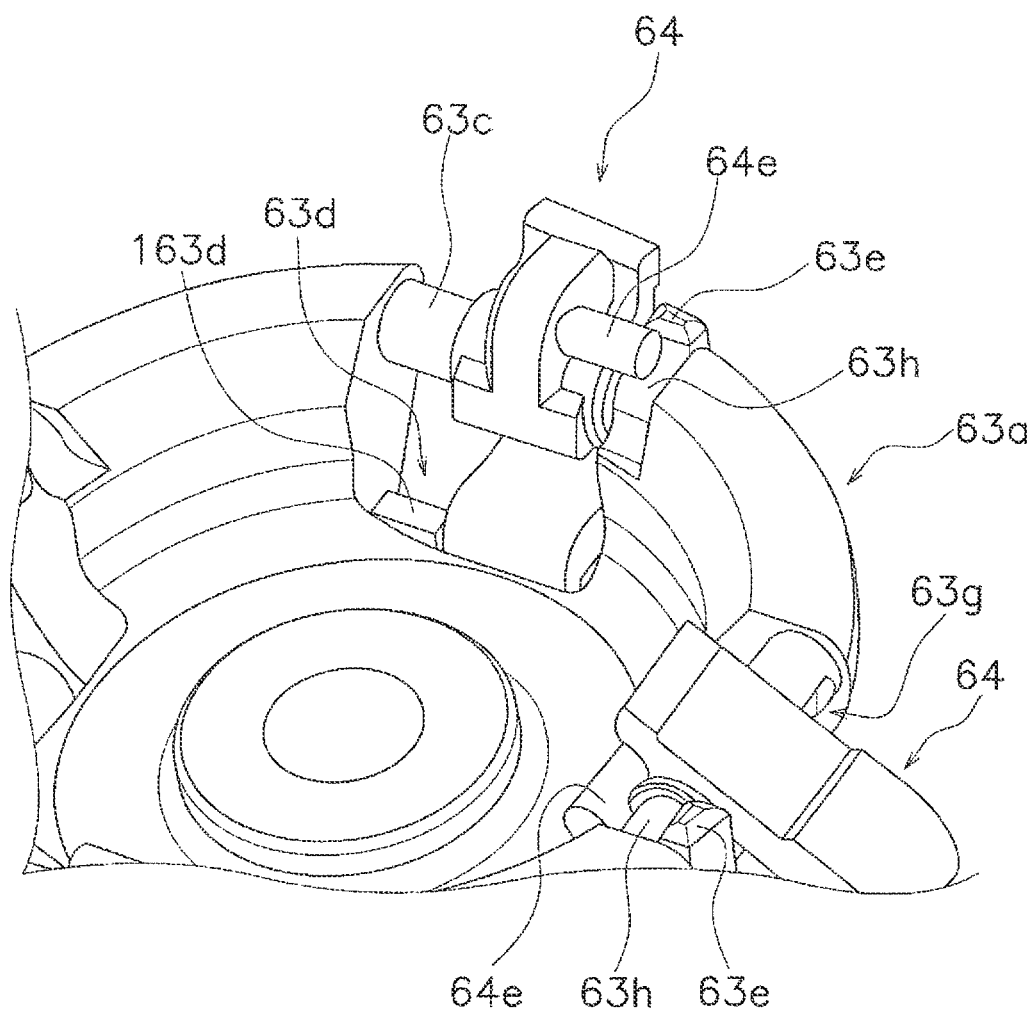
FIG. 12 is an enlarged oblique view of a shoe support recess to which the brake shoe is mounted.

As shown in FIG. 12, the mounting protrusion 63e is indisposed on the shoe attaching section 62b. Specifically, the mounting protrusion 63e is integrally formed on the main body section 63a of the shoe attaching section 62b on the outer peripheral side of the shoe attaching section 62b.

The mounting protrusion 63e protrudes outwardly from the main body section 63a of the shoe attaching section 62b. Specifically, the mounting protrusion 63e protrudes in a direction that is transverse to the direction in which the swinging shaft section 63c extends. More specifically, the mounting protrusion 63e protrudes substantially in a direction in which the spool shaft 20 extends. The swing regulating section 64e (mentioned below) of the brake shoe 64 can abut the mounting protrusion 63e.

The guide section 63h guides the swing regulating section 64e of the brake shoe 64. The guide section 63h is indisposed on the main body section 63a of the shoe attaching section 62b. Specifically, the guide section 63h is formed on the main body section 63a by notching one wall section of the shoe support recess 63b from the inside toward the outside with respect to the spool shaft 20. A gap is formed between this guide section 63h and the swinging shaft section 64e of the brake shoe 64; when the brake shoe 64 swings, the swinging shaft section 64e of the brake shoe 64 moves along the guide section 63h. In other words, the guide section 63h is formed on the main body section 63a along the swinging path of the swinging shaft section 64e when the brake shoe 64 swings.

Figure 11:
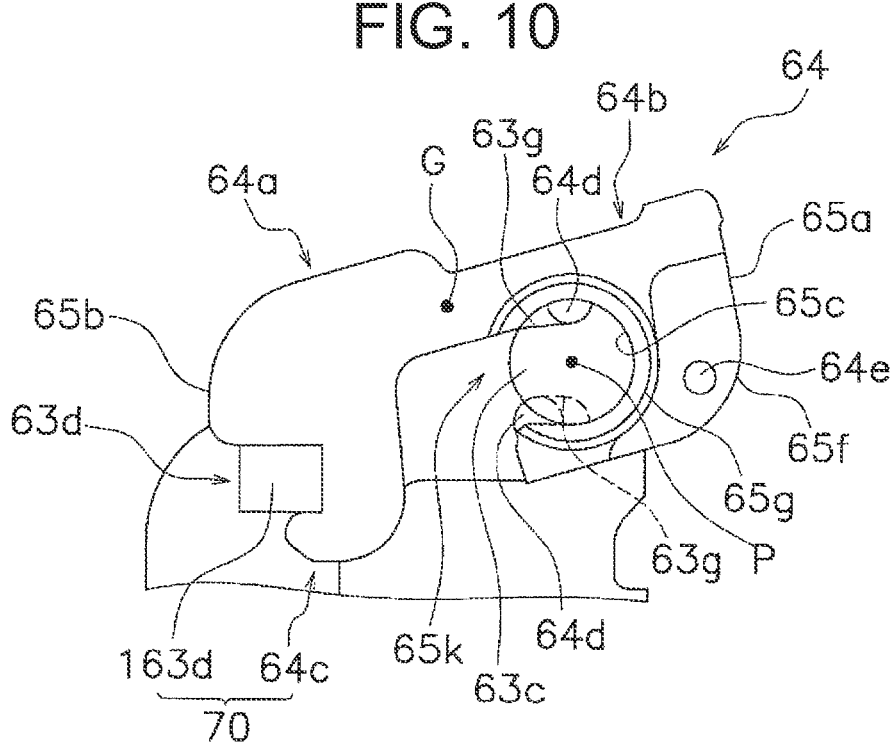
FIG. 11 is a side view showing the swinging shaft section and the brake shoe in the non-swingable position.

As shown in FIG. 8 and FIG. 11, the five fixed sections 63d are disposed in the shoe support recess 63b with spaces between five fixed sections 63d and the swinging shaft section 63c. The fixed section 63d engages the brake shoe 64 and non-swingably fixes the brake shoe 64. Specifically, the fixed section 63d comprises a shoe retaining section 163d. The shoe retaining section 163d extends along a direction that is transverse to the spool shaft 20 and is integrally formed on the shoe support recess 63b. Specifically, the shoe retaining section 163d extends substantially parallel to the swinging shaft section 63c and is integrally formed on the shoe support recess 63b. The cross section of the shoe retaining section 163d is formed in a nearly rectangle.

The shoe retaining section 163d forms an on/off switching mechanism 70 (refer to FIG. 11). The on/off switching mechanism 70 is a mechanism to switch the brake shoe 64 between the operable state (the state in FIG. 10) and the inoperable state (the state in FIG. 11). The operable state is a state in which the brake shoe 64 is in contact with the brake drum 66. The inoperable state is a state in which the brake shoe 64 is not in contact with the brake drum 66. By switching the brake shoe 64 between the operable state and the inoperable state, the number of brake shoes 64 that are in contact with the brake drum 66 can be easily set.

As shown in FIG. 7, the connecting section 62c is a thick-walled disc-like member and is integrally formed on the outer peripheral section of the boss section 62a. A main body section 63a of the shoe attaching section 62b is integrally formed of the end surface on the outer peripheral side of the connecting section 62c.

3-3. The Brake Shoe

The brake shoe 64 is a synthetic resin member having elasticity, such as, for example, polyamide resin, etc. As shown in FIG. 8 through FIG. 12, the brake shoe 64 is mounted to the rotating member 62 swingably around an axis that is transverse to the spool shaft 20. Specifically, the brake shoe 64 is mounted on the swinging shaft section 63c so as to be swingable around the swinging shaft section 63c of the rotating member 62. Additionally, the brake shoe 64 is movably mounted to the rotating member 62 around the axis of the swinging shaft section 63c.

Specifically, the brake shoe 64 is movable along the swinging shaft section 63c between the swingable position (the position in FIG. 10) that permits the swinging of the brake shoe 64 and the non-swingable position (the position in FIG. 11) in which the brake shoe 64 engages the shoe retaining section 163d. The swingable position is a position in which the brake shoe 64 swings on the left end part of the swinging shaft section 63c shown in FIG. 8. The non-swingable position is a position in which the brake shoe 64 has moved to the right end part of the swinging shaft section 63c shown in FIG. 8. Meanwhile, the brake shoe 64 is detachable with respect to the swinging shaft section 63c.

The brake shoe 64 comprises a main body section 64a, a mounting section 64b that is mounted to the swinging shaft section 63c, an engaging recess 64c that engages the shoe retaining section 163d, and a swing regulating section 64e that regulates the swinging range around the swinging shaft section.

The main body section 64a comprises a first end 65a and a second end 65b, the second end 65b on the opposite side of the main body section 64a relative to first end 65a. The main body section 64a is a member that is longer in the direction from the first end 65a to the second end 65b than the direction transverse to the direction from the first end 65a to the second end 65b. A contacting section 65f that comes into contact with the brake drum 66 is formed on the first end 65a. The contacting section 65f is formed in a circular arc shape.

Figure 9:
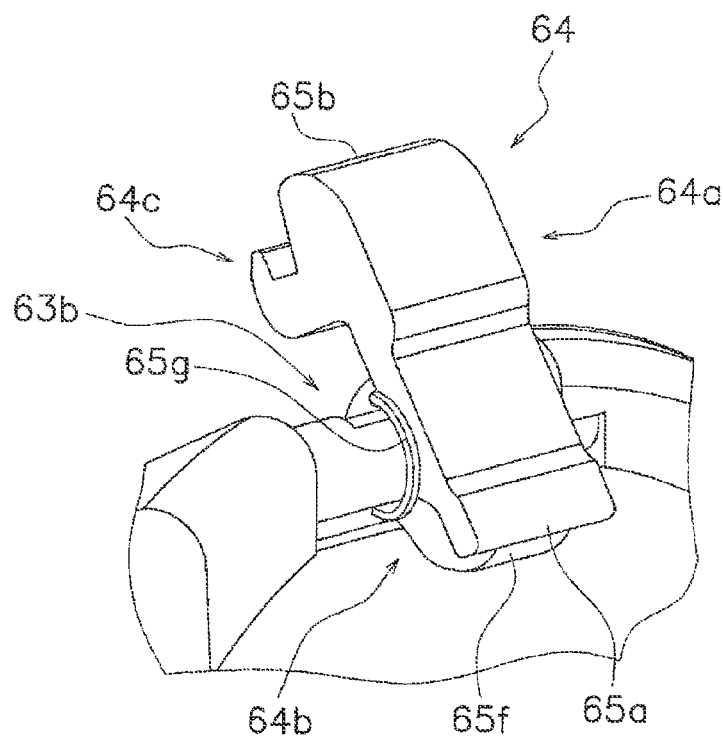
FIG. 9 is an enlarged oblique view of a brake shoe mounted to the shoe support recess.
Figure 10:
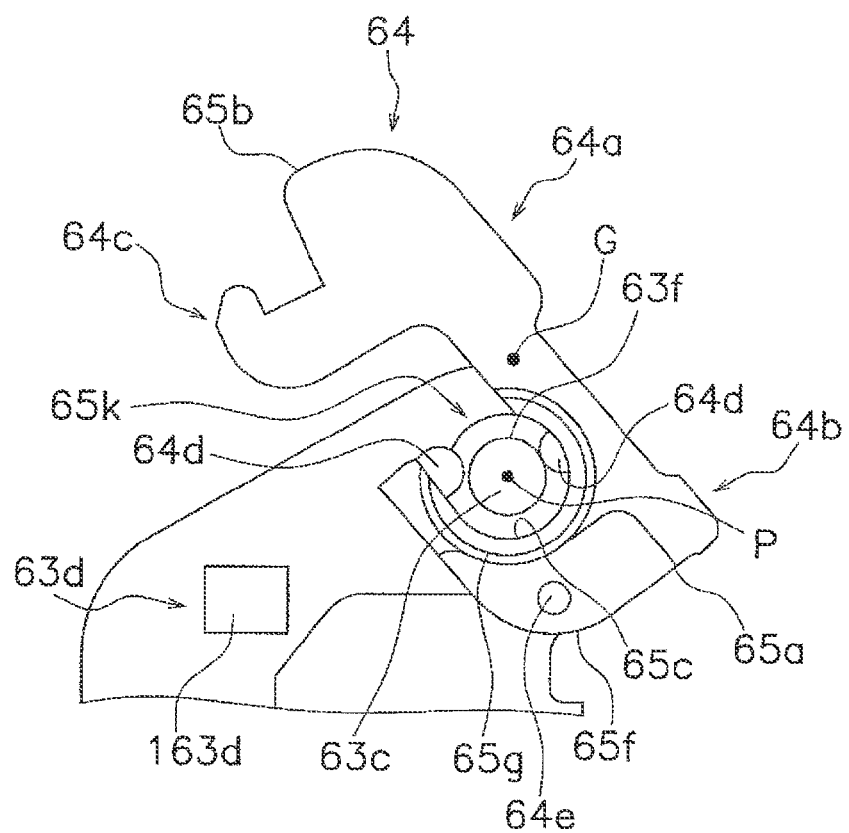
FIG. 10 is a side view showing the swinging shaft section and the brake shoe in the swingable position.

Additionally, the main body section 64a comprises a pair of boss sections 65g. The boss sections 65g are integrally formed on the main body section 64a so as to protrude outwards from the main body section 64a. More specifically, each of the boss sections 65g is formed protruding outwards from the main body section 64a so as to surround an engaging recess 64c mentioned below. In FIG. 9 to FIG. 11, only one of the pair of boss sections 65g is shown.

When the brake shoe 64 is located in the swingable position, the boss section 65g abuts the wall section of the shoe support recess 63b of the rotating member 62. For this reason, when the brake shoe 64 is in a swinging state around the swinging shaft section 63c in the swingable position, that is, in a state in which the rotating member 62 is rotating, the boss section 65g is pressed by the wall section of the shoe support recess 63b of the rotating member 62.

As shown in FIG. 10 and FIG. 11, the mounting section 64b is a part where the brake shoe 64 is mounted to the swinging shaft section 63c. The mounting section 64b is installed on the main body section 64a between the first end 65a and the center of gravity G. The mounting section 64b comprises a C-shaped mounting recess 65c. The mounting recess 65c is fitted to the swinging shaft section 63c. For example, the mounting recess 65c is fitted to the swinging shaft section 63c by clearance fitting. The opening section 65k of the mounting recess 65c is formed with a width that is narrower than the swinging shaft section 63c.

The mounting recess 65c comprises a protrusion 64d for swinging (one example of an engaging section for swinging). As shown in FIG. 10, the protrusion 64d for swinging engages the groove section 63f for swinging of the swinging shaft section 63c and is guided along the groove section 63f for swinging in the swingable position. When the protrusion 64d for swinging is guided along the groove section 63f for swinging, the brake shoe 64 swings around the swinging shaft section 63c.

Additionally, as shown in FIG. 11, when the brake shoe 64 is disposed in a predefined swinging angle, the protrusion 64d for swinging can be engaged with the notched section 63g for moving the swinging shaft section 63c. In this state, if the brake shoe 64 is moved in a direction along the swinging shaft section 63c, the protrusion 64d for swinging moves along the notched section 63g for moving the swinging shaft section 63c. With this, the brake shoe 64 moves from the swingable position to the non-swingable position. On the other hand, in a state in which the brake shoe 64 is positioned in the non-swingable position, if the brake shoe 64 is moved in a direction along the swinging shaft section 63c, the protrusion 64d for swinging moves along the notched section 63g for moving the swinging shaft section 63c. With this, the brake shoe 64 moves from the non-swingable position to the swingable position.

The engaging recess 64c is a part that engages the shoe retaining section 163d. The engaging recess 64c forms the on/off switching mechanism 70 (refer to FIG. 11). The engaging recess 64c is formed in a rectangular shape so as to surround the shoe retaining section 163d in three directions. The engaging recess 64c configures the on/off switching mechanism 70. The engaging recess 64c is fitted to the shoe retaining section 163d. More specifically, the engaging recess 64c is fitted to the shoe retaining section 163d when the brake shoe 64 is moved from the swingable position to the non-swingable position. With this, the brake shoe 64 is maintained so as to be non-swingable with respect to the rotating member 62 in the non-swingable position.

In this way, the number of brake shoes 64 that are not in contact with the brake drum 66, in other words, the number of brake shoes 64 that can be in contact with the brake drum 66, can be easily set by the on/off switching mechanism 70 (the shoe retaining section 163d and the engaging recess 64c). In other words, the braking force can be applied to the rotation in the line delivering direction of the spool 14 in a wide range with the on/off switching mechanism 70.

The swing regulating section 64e regulates the swing range around the swinging shaft section. As shown in FIG. 10 to FIG. 12, the swing regulating section 64e is installed on one end side of the main body section 64a of the brake shoe 64. Specifically, the swing regulating section 64e is installed in the mounting section 64b between the first end 65a and the swinging shaft section 63c. Additionally, the swing regulating section 64e is integrally formed in the mounting section 64b so as to protrude outward from the mounting section 64b. The swing regulating section 64e is a protrusion formed in a circular shape. The swing regulating section 64e can abut the mounting protrusion 63e.

A brake shoe 64 that comprises a configuration such as the above will swing with the swinging shaft core P as the center (refer to FIG. 10 and FIG. 11) due to the centrifugal force that is applied to the center of gravity G when the spool 14 rotates.

3-4. Moving Mechanism

The moving mechanism 68 can relatively move and position the brake shoe 64 and the brake drum 66 in the axial direction of the spool shaft 20. The moving mechanism 68, as shown in FIG. 3 through FIG. 6, comprises an operating member 60, a brake cam 71 (refer to FIG. 4), a first gear member 73 (refer to FIG. 6), and a second gear member 74 that engages with the first gear member 73.

The operating member 60 is, for example, a circular synthetic resin knob and is exposed outside of the first side cover 16a by the opening section 16c that is formed on the first side cover 16a. The operating member 60 is rotatably supported by a screw shaft 78 that is screwed to the outer side surface of a bottom section 35c of the shaft support section 35. The operating member 60 is positioned in a plurality of steps (for example, around forty (40) steps) by a positioning mechanism 76. The first gear member 73 is integrally formed with the operating member 60. The second gear member 74 is integrally and rotatably coupled with the brake drum 66.

As shown in FIG. 4, the brake drum 66 engages the shaft support section 35 via a brake cam 71. The brake cam 71 is non-rotatably fixed to the outer peripheral surface of the shaft support section 35. The brake cam 71 comprises a spiral cam groove 71a. The brake cam 71 (cam groove 71a) engages with, for example, a plurality of cam protrusions 66c that are formed protruding from the inner peripheral surface of the brake drum 66. With this, when the operating member 60 is rotated in one direction, the brake drum 66 moves in a direction that approaches the spool 14, and the braking force gradually becomes stronger. Additionally, if the operating member is rotated in the other direction, the brake drum 66 moves in a direction separate from the spool 14, and the braking force gradually becomes weaker.

4. The Behavior of the Spool Braking Device

4-1. Overview of the Behavior of the Spool Braking Device

With the spool braking device 25, when the operating member 60 is in the operation start position, the contacting section 65f of the brake shoe 64 comes into contact with the small-diameter side of the tapered surface 66a of the brake drum 66. At this time, the swinging angle of the brake shoe 64 is at its largest, and the pressing force with which the brake drum 66 presses the brake shoe 64 is at its smallest. With this, the braking force that is applied to the spool 14 is at its smallest.

When the operating member 60 is rotated from the operation start position, a first gear member 73 rotates. Then, a second gear member 74 that meshes with the first gear member 73 will rotate, and the brake drum 66 will also rotate. Then, the brake drum 66 moves in a direction that approaches the spool 14 via the brake cam 71. At this time, the contacting section 65f of the brake shoe 64 moves to the large-diameter side of the tapered surface 66a. Then, the swinging angle of the brake shoe 64 will become gradually smaller, and the pressing force with which the brake drum 66 presses the brake shoe 64 will gradually become larger. Consequently, the braking force that is applied to the spool 14 gradually increases.

When the operating member 60 is set to the maximum braking position, the swinging angle of the brake shoe 64 is at its the smallest, and the pressing force with which the brake drum 66 presses the brake shoe 64 is at its maximum. Consequently, the braking force that is applied to the spool 14 is at its largest. In this case, the contacting section 65f of the brake shoe 64 can be in contact with the large-diameter side of the tapered surface 66a of the brake drum 66 or with a tube-like section that is integrally formed connected to a proximal end section (the large-diameter side) of the tapered surface 66a.

Meanwhile, when operating the operating member 60 from the maximum braking position to the operation start position, contrary to the above, the braking force gradually becomes weaker.

4-2. Attaching Mode of the Brake Shoe

Here, the mode when attaching the brake shoe 64 to the swinging shaft section 63c will be explained.

First, the user opposes the opening section 65k of the mounting recess 65c of the brake shoe 64 to the swinging shaft section 63c. Next, the user sees the mounting protrusion 63e shown in FIG. 12 and disposes the swing regulating section 64e of the brake shoe 64 opposing the guide section 63h of the rotating member 62 so that the swing regulating section 64e of the brake shoe 64 will not abut the mounting protrusion 63e. Additionally, the protrusion 64d for swinging the brake shoe 64 is disposed opposing the groove section 63f for swinging in the swinging shaft section 63c. In this state, with the user pressing the brake shoe 64 toward the swinging shaft section 63c, the protrusion 64d for swinging the brake shoe 64 is disposed inside of the groove section 63f for swinging in the swinging shaft section 63c, and the mounting recess 65c of the brake shoe 64 is mounted to the swinging shaft section 63c. In this way, the brake shoe 64 is mounted to the swinging shaft section 63c.

In this way, by disposing the swing regulating section 64e of the brake shoe 64 in the range of the guide section 63h of the rotating member 62, the user, using the mounting protrusion 63e as a mark, can set the mounting angle of the brake shoe 64 to an appropriate angle. Additionally, in this state, by mounting the brake shoe 64 to the swinging shaft section 63c, the brake shoe 64 can be appropriately assembled to the rotating member 62. Furthermore, by disposing the protrusion 64d for swinging the brake shoe 64 inside of the groove section 63f for swinging in the swinging shaft section 63c, the brake shoe 64 can be reliably positioned to the swinging shaft section 63c.

Meanwhile, when the brake shoe 64 is mounted to the swinging shaft section 63c, since a gap is formed between the swing regulating section 64e of the brake shoe 64 and the guide section 63h of the rotating member 62, the brake shoe 64 can be rotated along the guide section 63h around the swinging shaft section 63c. The brake shoe 64 can also abut the mounting protrusion 63e. The swing range of the brake shoe 64 is limited by this mounting protrusion 63e. In a state in which the brake shoe 64 is abutting the mounting protrusion 63e, when moving the brake shoe 64 along the swinging shaft section 63c, as described below, the brake shoe 64 can be smoothly moved from the swingable position to the non-swingable position.

4-3. Settings and Behavior of the Brake Shoe

Each of the six brake shoes 64 can be set to the swingable position or the non-swingable position. Since the settings and behavior of each brake shoe 64 are the same, here, they will be explained with a focus on one brake shoe 64.

In a state where the brake shoe 64 is set to a swingable position (operable state), when the rotating member 62 rotates in conjunction with the rotation of the spool 14, the brake shoe 64 swings due to the centrifugal force. More specifically, when the rotating member 62 rotates, the protrusion 64d for swinging of the brake shoe 64 is guided along the groove section 63f for swinging the swinging shaft section 63c while the brake shoe 64 swings. Then, the brake shoe 64 comes into contact with the brake drum 66, and the brakes are applied to the rotation of the spool 14. Specifically, the contacting section 65*f* of the brake shoe 64 is in contact with the brake drum 66, thereby applying the brakes to the rotation of the spool 14.

Here, the brake shoe 64 is set to the swingable position; in a state in which the rotating member 62 is stopped, if the user swings the brake shoe 64 to a predefined swinging angle (abutted to the mounting protrusion 63*e*), the protrusion 64*d* for swinging the brake shoe 64 can engage the notched section 63*g* for moving. In this state, when the user pushes the brake shoe 64 in the direction along the swinging shaft section 63*c*, the protrusion 64*d* for swinging the brake shoe 64 is guided to the notched section 63*g* for moving the swinging shaft section 63*c*, and the brake shoe 64 is moved from the swingable position to the non-swingable position. Then, the engaging recess 64*c* of the brake shoe 64 will be fitted to the shoe retaining section 163*d* of the rotating member 62 in the non-swingable position. With this, the brake shoe 64 will not swing around the swinging shaft section 63*c* in the non-swingable position. This state is the inoperable state.

Additionally, in a state in which the brake shoe 64 is set to the non-swingable position and the rotating member 62 is stopped, when the user pushes the brake shoe 64 in the direction along the swinging shaft section 63*c* (in the direction opposite to the above), the fitting between the engaging recess 64*c* of the brake shoe 64 and the shoe retaining section 163*d* of the rotating member 62 will be released. Then, the protrusion 64*d* for swinging of the brake shoe 64 will be guided to the notched section 63*g* for moving the swinging shaft section 63*c*. Next, when the brake shoe 64 arrives at the swingable position, the protrusion 64*d* for swinging the brake shoe 64 will detach from the notched section 63*g* for moving the swinging shaft section 63*c* and will be disposed in the groove section 63*f* for swinging the swinging shaft section 63*c*. In this way, the brake shoe 64 moves from the non-swingable position to the swingable position.

In this way, each of the six brake shoes 64 can be easily set to either the swingable position or the non-swingable position. That is, the braking force that is applied to the rotation of the spool 14 can be adjusted by disposing each brake shoe 64 to the swingable position or to the non-swingable position.

5. Characteristics (A) In the present spool braking device 25, when mounting the brake shoe 64 to the swinging shaft section 63*c* of the rotating member 62, the mounting guide section of the rotating member 62 guides the brake shoe 64. In other words, with the brake shoe 64 being guided to the swinging shaft section 63*c* by the mounting protrusion 63*e* of the rotating member 62 (one example of the first mounting guide section) and the groove section 63*f* for swinging (one example of the second mounting guide section), the brake shoe 64 is mounted to the swinging shaft section 63*c* of the rotating member 62 with an appropriate position. In this way, with the present spool braking device 25, the brake shoe 64 can be properly attached to the rotating member 62. Meanwhile, the mounting guide section is configured by the mounting protrusion 63*e* of the rotating member 62 and the groove section 63*f* for swinging.

Additionally, in conventional technology, when mounting the brake shoe 64 to the swinging shaft section 63*c*, if the brake shoe 64 is incorrectly guided to the swinging shaft section 63*c*, there was the risk that the engaging recess 64*c* would fit the bottom part of the shoe support recess 63*b*. Furthermore, if the engaging recess 64*c* fits the bottom part of the shoe support recess 63*b*, not only will the brake shoe 64 not operate appropriately, but there is the risk that the engaging recess 64*c* of the brake shoe 64 would deform.

However, in the present spool braking device 25, the brake shoe 64 can be correctly guided to the swinging shaft section 63*c* with the mounting protrusion 63*e* of the rotating member 62 and the groove section 63*f* for swinging. For this reason, the engaging recess 64*c* of the brake shoe 64 can be correctly disposed inside of the shoe support recess 63*b*, and the deformation of the engaging recess 64*c* of the brake shoe 64 can be prevented.

(B) In the present spool braking device 25, since the mounting angle of the brake shoe 64 is regulated by the mounting protrusion 63*e*, the brake shoe 64 is mounted to the swinging shaft section 63*c* of the rotating member 62 in the appropriate position. That is, with the present spool braking device 25, the brake shoe 64 can be properly attached to the rotating member 62. Additionally, in the same way as discussed above in (A), the engaging recess 64*c* of the brake shoe 64 can be appropriately disposed inside of the shoe support recess 63*b*, and the deformation of the engaging recess 64*c* of the brake shoe 64 can be prevented.

(C) In the present spool braking device 25, since the user can determine whether or not the mounting angle of the brake shoe 64 is correct based on the mounting protrusion 63*e*, the brake shoe 64 is mounted to the swinging shaft section 63*c* of the rotating member 62 in the appropriate position. That is, with the present spool braking device 25, the brake shoe 64 can be properly attached to the rotating member 62. Additionally, in the same way as discussed above in (A), the engaging recess 64*c* of the brake shoe 64 can be appropriately disposed inside of the shoe support recess 63*b*, and the deformation of the engaging recess 64*c* of the brake shoe 64 can be prevented.

(D) In the present spool braking device 25, since the mounting protrusion 63*e* protrudes from the main body section 63*a* of the rotating member 62 toward a direction that is transverse to the direction in which the swinging shaft section 63*c* extends, the user can visually and reliably recognize the mounting protrusion 63*e* as a mark, and the brake shoe 64 can be mounted to the swinging shaft section 63*c* of the rotating member 62 with an appropriate position. That is, with the present spool braking device 25, the brake shoe 64 can be properly attached to the rotating member 62. Additionally, in the same way as discussed above in (A), the engaging recess 64*c* of the brake shoe 64 can be appropriately disposed inside of the shoe support recess 63*b*, and the deformation of the engaging recess 64*c* of the brake shoe 64 can be prevented.

(E) In the present spool braking device 25, since the swing regulating section 64*e* of the brake shoe 64 can abut the mounting protrusion 63*e*, the user can reliably grasp that the mounting state of the brake shoe 64 is appropriate by abutting the swinging shaft section 64*e* of the brake shoe 64 to the mounting protrusion 63*e*.

(F) In the present spool braking device 25, since the mounting position of the brake shoe 64 is regulated by the groove section 63*f* for swinging, the brake shoe 64 can be mounted to the appropriate position of the swinging shaft section 63*c*. That is, with the present spool braking device 25, the brake shoe 64 can be properly attached to the rotating member 62.

(G) In the present spool braking device 25, the brake shoe 64 swings in a state in which the mounting position of the brake shoe 64 is regulated by the groove section 63*f* for swinging. Additionally, by moving the brake shoe 64 along the swinging shaft section 63c, the position of the brake shoe 64 can be changed from a swingable position to a non-swingable position. In this way, in the present spool braking device 25, the brake shoe 64 can be swung in a state when mounted to an appropriate position of the swinging shaft section 63c. Additionally, in the present spool braking device 25, the brake shoe 64 can be easily made to be non-swingable by simply moving the brake shoe 64 along the swinging shaft section 63c.

(H) In the present spool braking device 25, the brake shoe 64 can be reliably positioned in the swinging shaft section 63c by engaging the mounting protrusion 64d of the brake shoe 64 and the groove section 63f for swinging of the rotating member 62.

6. Other Embodiments (a) The above-described embodiment illustrates an example in which the brake shoe 64 comprises a protrusion 64d for swinging, the rotating member 62 comprises a groove section 63f for swinging, and a mounting guide that prevents a physically incorrect mounting is installed. Instead of the above, a visual mounting guide that allows the operator to reliably see and confirm the mounting so that an incorrect mounting can be prevented can be installed. For example, a visual mounting guide can include a symbol such as a ▼ mark on the rotating member 62.

(b) In the above-described embodiment, an example in which the brake shoe 64 comprises an engaging recess 64c and the rotating member 62 comprises a shoe retaining section 163d was shown. Instead of the above, the invention can be configured so that the brake shoe 64 comprises a shoe retaining section 163d and the rotating member 62 comprises an engaging recess 64c.

(c) In the above-described embodiment, an example in which the brake shoe 64 comprises an engaging recess 64c and the rotating member 62 comprises a shoe retaining section 163d was shown. Here, instead of the engaging recess 64c of the brake shoe 64, as shown in FIG. 13, a hole 164c can be formed in the brake shoe 64.

Figure 13:
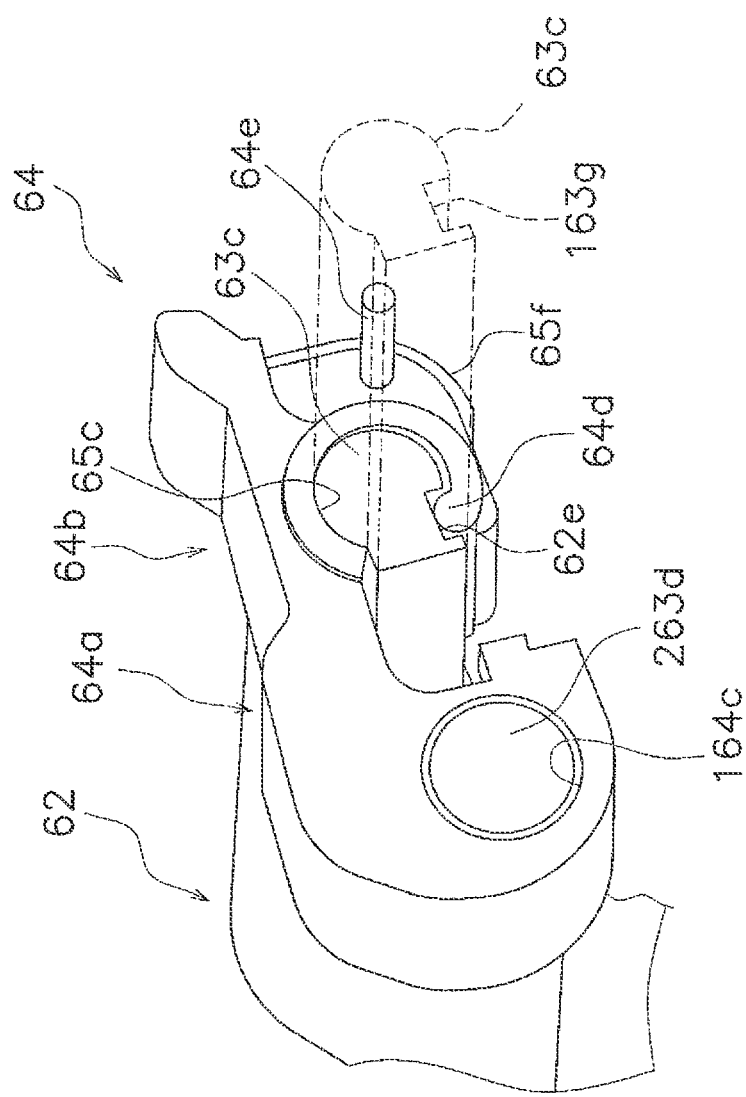
FIG. 13 is an enlarged oblique view showing the swinging shaft section and the brake shoe in the non-swingable position according to another embodiment.

Here, FIG. 13 is an example in which the spool braking device 25 does not comprise a protrusion 64d for swinging, a groove section 63f for swinging, or a notched section 63g for moving. Additionally, in FIG. 13, the same reference symbols are used for the members and parts that are the same as those in the above-described embodiment.

In this case, the brake shoe 64 comprises a hole 164c, and the rotating member 62 comprises a shoe retaining section 263d. For example, the shoe retaining section 263d is formed in a circular shape. Here, by moving the brake shoe 64 along the swinging shaft section 63c, the shoe retaining section 263d is engaged with the hole 164c. With this, the brake shoe 64 is non-swingably fixed. In other words, the brake shoe 64 can be reliably fixed in the inoperable state.

Meanwhile, here, an example in which the brake shoe 64 comprises a hole 164c and the rotating member 62 comprises a shoe retaining section 263d was shown, but the invention can also be configured so that the brake shoe 64 comprises a shoe retaining section 263d and the rotating member 62 comprises a hole 164c.

(d) In the above-described embodiment, an example in which the brake drum 66 is disposed inwardly in the radial direction with respect to the brake shoe 64 was shown. Instead of the above, the invention can be configured so that the brake drum 66 is disposed outwardly in the radial direction with respect to the brake shoe 64. In this case, when the brake shoe 64 is in a swinging position due to the centrifugal force, the end part of the outer peripheral side of the brake shoe 64 comes into contact with the brake drum 66. With this, the brakes can be applied to the spool 14.

(e) In the above-described embodiment, an example was shown in which the brake shoe 64 is non-swingably retained by the rotating member 62 due to the engaging recess 64c or the hole 164c of the brake shoe 64 engaging with the shoe retaining sections 163d and 263d of the rotating member 62. In addition, as shown in FIG. 13, the brake shoe 64 can be positioned on the rotating member 62 by including a positioning recess 62e on the rotating member 62.

Here, FIG. 13 is an example in which the spool braking device 25 comprises one protrusion 64d for swinging and a groove section 163g for moving that guides the protrusion 64d for swinging. Additionally, in FIG. 13, the same reference symbols are used for the members and parts that are the same as those in the above-described embodiment.

As shown in FIG. 13, the positioning recess 62e is formed on the outer peripheral surface of the end side of the swinging shaft section 63c (the opposite side of the groove section 63f for swinging). When the protrusion 64d for swinging is guided to the groove section 163g for moving and, as shown in FIG. 13, and when the brake shoe 64 is positioned in the non-swingable position, the brake shoe 64 is non-swingably retained in the shoe retaining section 263d, and the protrusion 64d for swinging is engaged with the positioning recess 62e. Here, the positioning recess 62e is formed so that the depth will be shallower than the groove section 163g for moving. For this reason, if the protrusion 64d for swinging is engaged with the positioning recess 62c, the swinging shaft section 63c is pressed against the mounting recess 65c. With this, the brake shoe 64 can be reliably retained in the non-swingable position. Additionally, the user can confirm that the brake shoe 64 is in the inoperable state with a push feeling (a click feeling) when engaging the engaging section for movement regulation with the positioning recess 62e.

Meanwhile, here, an example was shown in which the protrusion 64d for swinging is engaged with the positioning recess 62e in the non-swingable position. Instead of the above, the invention can be configured so that a positioning recess or a protrusion is disposed along the groove section 163g for moving the brake shoe 64 from the swingable position to the non-swingable position. In this case, the user can confirm that the brake shoe 64 is in the inoperable state with a click feeling when the protrusion 64d for swinging goes over the positioning recess or the protrusion.

What is claims is:

1. A dual-bearing reel spool braking device for applying a braking force to a spool rotatably mounted on a reel body, the dual-bearing reel spool braking device comprising:
   a brake drum configured to be non-rotatably attached to the reel body;
   a rotating member configured to rotate in conjunction with the rotation of the spool; and
   a brake shoe detachably attached to the rotating member and configured to contact the brake drum,
   the rotating member comprising a main body section, a swinging shaft section disposed on the main body section and swingably supporting the brake shoe, and the main body section including a mounting guide section at least partially protruding from the main body section and being configured to guide the brake shoe when mounting the brake shoe to the swinging shaft section.

2. The dual-bearing reel spool braking device according to claim 1, wherein
the brake shoe is configured to swing due to the centrifugal force generated by the rotation of the rotating member and is configured to be braked by coming into contact with the brake drum.

3. The dual-bearing reel spool braking device according to claim 2, wherein
the mounting guide section comprises a first mounting guide section configured to regulate a mounting angle of the brake shoe.

4. The dual-bearing reel spool braking device according to claim 1, wherein
the mounting guide section comprises a first mounting guide section configured to regulate the mounting angle of the brake shoe.

5. The dual-hearing reel spool braking device according to claim 4, wherein
the first mounting guide section is a protrusion that protrudes from the main body section.

6. The dual-bearing reel spool braking device according to claim 4, wherein
the mounting guide comprises a second mounting guide section, and the second mounting guide section is disposed on the swinging shaft section and is configured to regulate the mounting position of the brake shoe.

7. The dual-bearing reel spool braking device according to claim 6, wherein
the swinging shaft section movably supports the brake shoe in a direction in which the swinging shaft section extends, and
the second mounting guide section is a protrusion or a recess disposed on the peripheral surface of the swinging shaft section.

8. The dual-bearing reel spool braking device according to claim 7, wherein
the brake shoe comprises a recess or a protrusion configured to engage the protrusion or the recess of the second mounting guide section.

9. The dual-hearing reel spool braking device according to claim 5, wherein
the protrusion extends from the main body section toward a direction transverse with the direction in which the swinging shaft section extends.

10. The dual-bearing reel spool braking device according to claim 9, wherein
the brake shoe comprises a swing regulating section configured to regulate a swing range around the swinging shaft section, and
the swing regulating section configured to abut the protrusion.

11. The dual-bearing reel spool braking device according to claim 5, wherein
the brake shoe comprises a swing regulating section configured to regulate the swing range around the swinging shaft section, and
the swing regulating section configured to abut the protrusion.

12. A dual-bearing reel spool braking device for applying a braking force to a spool rotatably mounted on a reel body, the dual-bearing reel spool braking device comprising:
a brake drum configured to be non-rotatably attached to the reel body;
a rotating member configured to rotate in conjunction with the rotation of the spool; and
a brake shoe detachably attached to the rotating member and configured to contact the brake drum,
the rotating member comprising a main body section, a swinging shaft section disposed on the main body section and swingably supporting the brake shoe, and the main body section including a mounting guide section, and configured to guide the brake shoe when mounting the brake shoe to the swinging shaft section, the mounting guide section comprising a protrusion protruding from the main body section and extending from the main body section toward a direction transverse with the direction in which the swinging shaft section extends to regulate the mounting angle of the brake shoe.

13. A dual-bearing reel spool braking device for applying a braking force to a spool rotatably mounted on a reel body, the dual-bearing reel spool braking device comprising:
a brake drum configured to be non-rotatably attached to the reel body;
a rotating member configured to rotate in conjunction with the rotation of the spool; and
a brake shoe detachably attached to the rotating member and configured to contact the brake drum,
the rotating member comprising a main body section, a swinging shaft section disposed on the main body section and swingably supporting the brake shoe, and the main body section including a mounting guide section, and configured to guide the brake shoe when mounting the brake shoe to the swinging shaft section, the mounting guide section comprising a first mounting guide section configured to regulate the mounting angle of the brake shoe and a second mounting guide section disposed on the swinging shaft section and configured to regulate the mounting position of the brake shoe.

* * * * *